US006173360B1

United States Patent
Beardsley et al.

(10) Patent No.: US 6,173,360 B1
(45) Date of Patent: Jan. 9, 2001

(54) APPARATUS AND METHOD FOR ALLOWING EXISTING ECKD MVS DASD USING AN ESCON INTERFACE TO BE USED BY AN OPEN STORAGE USING SCSI-TYPE INTERFACE

(75) Inventors: Brent Cameron Beardsley; Kenneth Fairclough Day, III; Michael Howard Hartung; William Frank Micka, all of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/005,052

(22) Filed: Jan. 9, 1998

(51) Int. Cl.[7] ................................................... G06F 12/00
(52) U.S. Cl. .............................. 711/111; 711/4; 711/100; 711/112
(58) Field of Search ............................... 711/4, 100, 111, 711/112, 6; 714/13

(56) References Cited

U.S. PATENT DOCUMENTS

| 5,155,835 | * | 10/1992 | Belsan ................................ 395/425 |
| 5,193,184 | * | 3/1993 | Belsan et al. ....................... 395/600 |
| 5,210,866 | * | 5/1993 | Milligan et al. .................... 395/575 |
| 5,247,638 | * | 9/1993 | O'Brien et al. ..................... 395/425 |
| 5,404,361 | * | 4/1995 | Casorso et al. ..................... 371/40.1 |
| 5,455,926 | * | 10/1995 | Keele et al. ............................. 711/4 |
| 5,459,853 | * | 10/1995 | Best et al. ............................ 711/114 |
| 5,499,354 | * | 3/1996 | Ashoff et al. ....................... 395/456 |
| 5,506,979 | * | 4/1996 | Menon ................................ 711/112 |
| 5,530,960 | * | 6/1996 | Parks et al. ......................... 395/825 |
| 5,555,371 | * | 9/1996 | Duyanovich et al. ................ 714/13 |
| 5,581,724 | * | 12/1996 | Belsan et al. ....................... 395/441 |
| 5,581,743 | * | 12/1996 | Burton et al. ................... 395/500.47 |
| 5,619,723 | * | 4/1997 | Jones et al. ......................... 395/823 |
| 5,630,092 | * | 5/1997 | Carreiro et al. .................... 711/111 |
| 5,664,144 | * | 9/1997 | Yanai et al. ........................ 711/113 |
| 5,717,956 | * | 2/1998 | Shinosaka et al. .................... 710/65 |
| 5,742,792 | * | 4/1998 | Yanai et al. ........................ 711/162 |
| 5,875,479 | * | 2/1999 | Blount et al. ...................... 711/162 |
| 5,951,691 | * | 9/1999 | Ng et al. ................................ 714/5 |

* cited by examiner

*Primary Examiner*—John W. Cabeca
*Assistant Examiner*—Pierre-Michel Bataille
(74) *Attorney, Agent, or Firm*—Dan Hubert & Asscoc.

(57) ABSTRACT

A converter system that allows a host system using a first interface to use a second storage using a second interface. The invention provides a method to allow an ECKD MVS DASD storage using an ESCON interface to be used by an open system using a SCSI-type interface without changes to the ESCON storage or the open storage interfaces. The method also permits the SCSI-type interfaced open system to be physically located greater than 25 meters from the ESCON storage system. The method involves mapping the SCSI-type interface data and commands into parameters used and understood by the ESCON storage. The invention may also be implemented to provide a digital data storage medium containing the method of the invention and a digital apparatus capable of executing the invention.

16 Claims, 7 Drawing Sheets

APPARATUS AND METHOD FOR ALLOWING EXISTING ECKD MVS DASD USING AN ESCON INTERFACE TO BE USED BY AN OPEN STORAGE USING SCSI-TYPE INTERFACE

BACKGROUND OF THE INVENTION

1. Field of the Invention

The present invention relates to the transfer of data between a system using one type of interface to an external storage system using a different type of interface. More particularly, the invention relates to a converter that allows an existing extended-count-key-data storage system to be used as a storage device for a SCSI-type interfaced open host system.

2. Description of the Related Art

A direct access storage device (DASD) comprises one or more movably mounted disks coated with remnant magnetic material. Either fixed block or variable length records are recorded along circular track extents formatted on the disks. The tracks are concentric such that a movable arm with a READ or WRITE head or a switchable set of fixed heads must be positioned or activated over the desired track to effectuate transfer of the records to or from the disk. In an assembly of disks, the set of all tracks that can be accessed without repositioning the access mechanism is termed a "cylinder". Where a DASD stores 500 tracks per disk, there would be 500 cylinders. The cylinders may be grouped in logical or arbitrary sets. Contiguous cylinders are grouped together to form "bands" such that cylinders 0–10 might be a first band, and 11–100 a second band. Efficient data movement frequently has required bulk transfer, that is, staging a track's worth of data or even a cylinder's worth of data at a time, to another level of storage.

There is no connection between the logical organization of data such as datasets and their counterpart cylinder and track location in DASD storage. For some purposes, such as reducing READ data transfer time, it is advantageous to store the dataset records in contiguous tracks or cylinders. For other purposes, such as batch DASD recordation of random WRITE updates of records, the writing might be to contiguous DASD storage so that each record written would be remote from other records in the same dataset stored elsewhere in DASD.

Another level of storage common to DASD environments is virtual storage (VS). A VS device may comprise a single DASD using multiple disks or several DASDs where each employs one or more disks. Regardless, the allocation of data to the VS is coordinated by a special controller contained in the VS device or a host system/subsystem to which the VS system is connected. An implementation of VS could comprise a system using count-key-data (CKD) or extended-count-key-data (ECKD). The controller generally determines where data will be stored. For example, the controller decides which disk of the VS device will receive the data. By using a separate controller to allocate data to the various disks, precious host processor time is freed up for other purposes. As far as the host processor is concerned, the VS device appears to be one disk. One example of such an arrangement, hereafter referred to as a virtual storage system (VSS), is where the VS device or system is coupled to an ECKD system such as an IBM 3990 system—manufactured by the assignee of the current invention.

Commonly, the interface between a VSS system and a host system to which it may be connected is uniform. For example, a host system using a SCSI-type interface internally will usually be connected to a VSS system using a SCSI-type interface. However, certain types of conventional high end data processing equipment, deemed enterprise, may use a different channel-to-control-unit input/output (I/O) interface using fiber or optical cables as a transmission medium. This type of enterprise system connection, deemed "ESCON," may be found, for example, on a RAMAC multiple disk array. ESCON may also be used in connecting an MVS system to or within the VSS.

However, an ESCON interface used by the VSS precludes the use of VSS with "open" systems. An open system is a system whose characteristics comply with standards made available throughout the industry—such as SCSI-types, IDE, or EIDE—and that therefore cannot be connected to other systems not complying with the same standard. Simply put, it currently is not possible to connect an open host system utilizing an open interface with a VSS. What is needed is an apparatus and method that would allow a high end VSS to be attached to a host open system, thereby allowing the VSS to act as extended "open" storage for the open host system.

SUMMARY OF THE INVENTION

Broadly, the present invention concerns a converter system that allows an open host system using a first interface to use a second storage system using a second interface.

In one embodiment, the invention may be implemented to provide a conversion method to allow a VSS using an ESCON interface to be used by an open host system using an open interface without necessitating changes to the VSS or the open host interfaces. In another embodiment, the VSS also may perform the volume management of an associated MVS system. If the open host system employs a SCSI-type interface, then the method permits the open system to be physically located greater than 25 meters from the VSS.

In one embodiment, the method involves mapping the SCSI-type interface data and commands into parameters used and understood by the VSS. For example, the command sets used with a SCSI-type connection are very different from the command sets used with an ESCON connection. In one embodiment, when data is transferred from the open host SCSI-system to the VSS ESCON storage, the method of the present invention maps the SCSI-type command set used by the host into a command set understandable by the VSS ESCON storage.

In another embodiment, the invention may be implemented to provide an apparatus including a hard drive and a processor communicatively coupled to a storage unit, wherein the processor executes the method steps discussed above. The apparatus may also include an input/output (I/O) interface and an I/O line, such as a bus, cable, electromagnetic link, or other means for exchanging data between the processor, the storage unit, and an external storage unit.

In still another embodiment, the invention may be implemented to provide an article of manufacture comprising a data storage medium tangibly embodying a program of machine-readable instructions executable by a digital data processing apparatus to perform method steps for translating the first-type interface parameters into second-type interface parameters used and understood by the VSS.

The preferred embodiments of the present invention afford its users with a number of distinct advantages. For one, the converter system allows a high end VSS employing ECKD formatted DASDs to be attached to an open host system. This provides the open system with an ESCON backup system that can also be used to restore the host open system in case of a host system failure or any other condition that prevents access to requested data.

Furthermore, the invention in its various embodiments also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

One aspect of the invention concerns a converter system that allows a host system using a first interface to communicate with a storage system using a second interface. This invention, comprising a digital data processing system, may be embodied by various hardware components and interconnections as shown in FIGS. 1A and 1B.

Figure 1A:
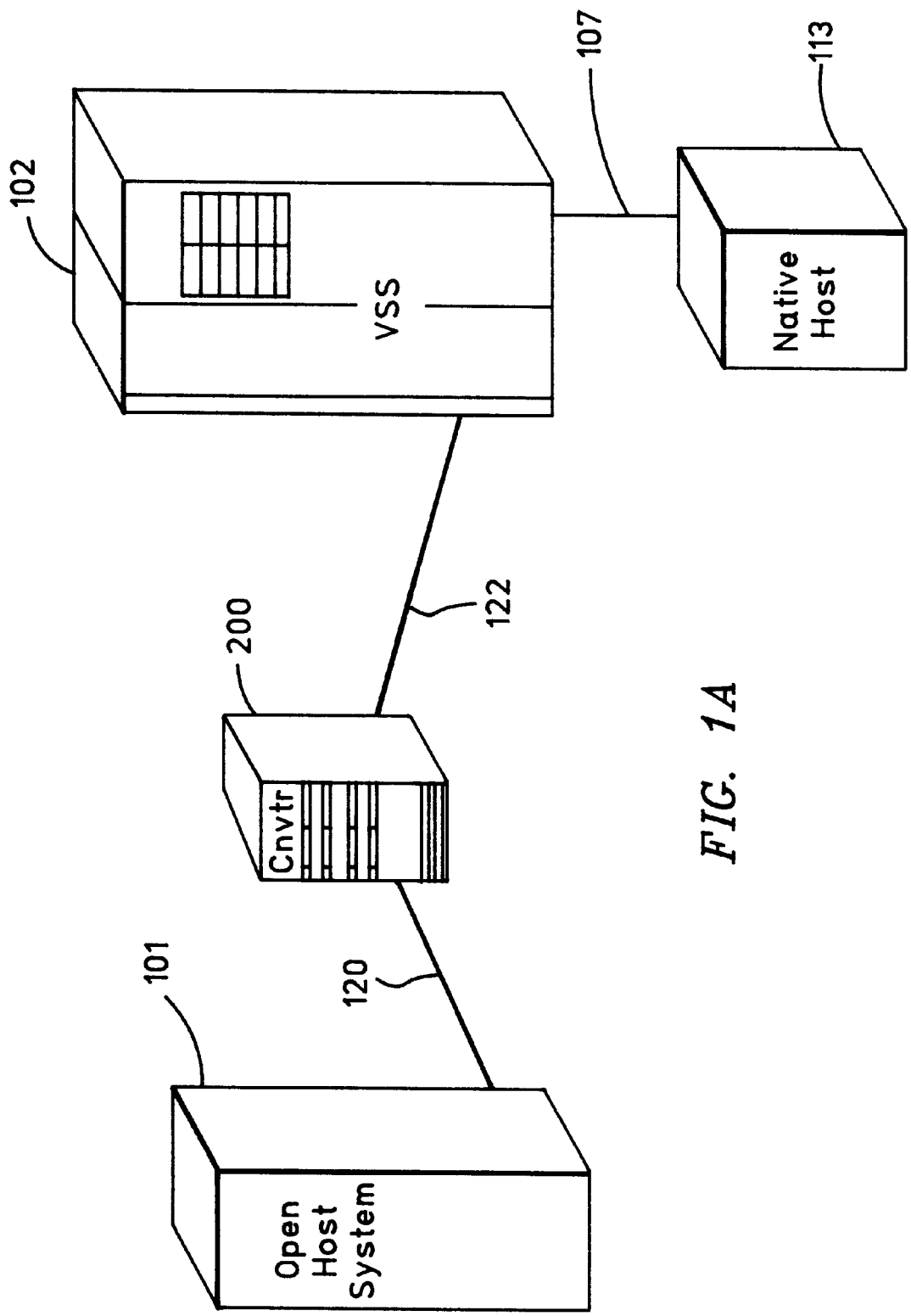
FIG. 1A is a general illustration of a digital data processing and storage machine used in accordance with the present invention.
Figure 1B:
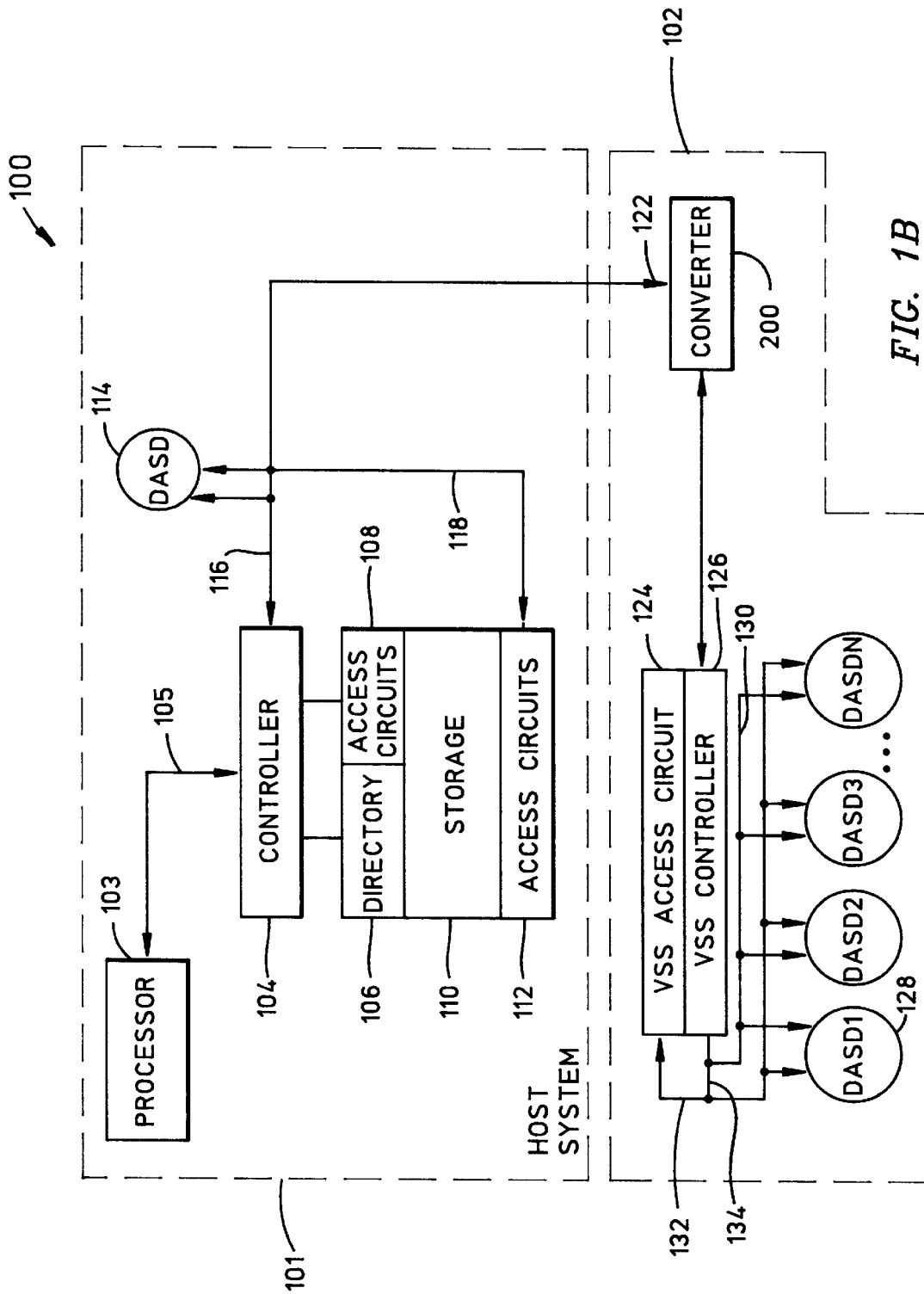
FIG. 1B is a block diagram of one embodiment of a digital data processing and storage machine similar to that shown in FIG. 1A and in accordance with the present invention.

The converter system of FIG. 1A comprises an open host system 101 communicatively coupled to a converter 200 via a communication link 120. In a preferred embodiment of the current invention, the link 120 is a small computer system interface (SCSI) parallel bus commonly used for linking mass storage devices such as magnetic disks and tape drives to a computer. However, the invention may be practiced using any interface having a known format, such as SCSI or fibre cable.

SCSI-type interfaces handle higher-level commands, such as asking what type of devices are on the bus (inquiry) and read or write a block of data. That is, in addition to specifying the physical characteristics of the bus such as connector type, voltages used, SCSI sets the standard for each type of peripheral device used, such as a hard disk or CD-ROM, including a specification of the supported commands and expected responses. The commands usually include approximately twelve commands per peripheral device. SCSI-type interface commands can be either standard or vendor specific. The WRITE/READ random access command for bard disks allows the SCSI-type interface to determine the logical block address of data and the length of the block to be written from the hard drive device. The hard disks read and write data according to the logical block addresses, and the remaining elements of the open host system 101 have no knowledge of the hard disk's physical geometry, such as number of disks, surfaces, cylinders, or sectors. For example, a hard disk SCSI-type command (Read Capacity) enables a host controller to query a storage disk for its capacity, expressed as a number of logical blocks, and block size, typically 512-bytes per block.

The converter 200 shown in FIG. 1A is communicatively linked to a virtual storage system (VSS) 102 using a communicative link 122. An exemplary example of the VSS 102 of FIG. 1A is the IBM 3990 manufactured by the assignee of the current invention. Preferably, the link 122 is an enterprise system connection (ESCON). An ESCON connection is a approximately 20 MB/sec fibre optic link for linking mainframes to direct access storage systems (DASDs) or other mainframes. Communication channel links up to three kilometers and up to 43 kilometers with repeaters are supported within ESCON implementations. However, because of the expense associated with the improved performance of an ESCON interface, popular interfaces such as IDE and SCSI are used in smaller- and medium-sized computer systems.

The VSS 102 may include a native host system 113—shown separately in FIG. 1A—communicatively coupled via a communication link 107. Preferably, the link is an ESCON connection using the ESCON interface. The native host 113 may include components commonly found in multiple virtual system (MVS) systems such as a processor, storage, cache, a DASD array, or DASD controllers and circuits. As stated, the native host 113 may be embodied in the VSS 102 or may be external to the VSS. And, although a preferred embodiment of the converter system is shown in FIG. 1A, various physical and logical arrangements for the invention will become obvious to those skilled in the art after reviewing the discussion below.

One such digital data processing arrangement referred to above is a converter system 100 as shown in FIG. 1B. The converter system 100 may include the open host system 101 and a VSS 102. In another embodiment, the open host system 101 may include the VSS 102. The open host system 101 includes a processor 103, such as a microprocessor, application specific hardware, or other processing machine, communicatively coupled to a controller 104, a directory 106, access circuits 108 and 112, and storage 110. The controller 104 is a device that coordinates and controls the operation of one or more I/O devices such as storage devices, and synchronizes the operation of such device with the operation of the converter system 100 as a whole. The line 105 may be a line, bus, cable, electromagnetic link, or other means for exchanging data with the processor 103. The directory 106, and the access circuits 108 and 112 are used by the processor 103 and the controller 104 in accessing information from the direct access storage device 114 (DASD) and for transferring data and commands to the DASD 114. Communication links 116, 118, and 120 allow for data and commands to be interchanged readily between the respective components.

In the present example, the storage 110 may include a fast-access memory and cache. The fast-access memory preferably comprises random access memory, and may be used to store the programming instructions executed by the processor 103 during such execution. The cache may be used as a temporary storage location when transferring data and commands from the DASD 114 to the processor 103 or to any other component of converter system 100 requiring receipt of the data and commands such as a converter 200. Although the converter 200 is shown in FIG. 1A as separate from the open host system 101, in an alternate embodiment, it may be included in the open host system 101 or, as shown in FIG. 1B, in the VSS 102.

Further, a DASD 114 is shown in FIG. 1B, and may comprise, for example, one or more magnetic data storage disks, or other suitable storage devices known to those skilled in the art. Furthermore, the communication links of converter system 100 may comprise a line, bus, cable, electromagnetic link, or other means for exchanging data between the components of the converter system.

The converter 200 shown in FIG. 1B and discussed below, allows data and commands transferred from the DASD 114—the DASD 114 using a first interface—to be mapped to the VSS 102 using a second or different interface protocol. Data and commands transferred from the DASD to the converter 200 are further mapped and then transferred to the VSS 102 DASDs (FIG. 1B) via link 122.

In the embodiment shown in FIG. 1B, the VSS 102 includes the native host 113 which employs an count key data (CKD) storage system. The VSS 102 may include one or more storage system access circuits or controllers or the circuits and controllers may be contained in each respective storage system. In the embodiment shown in FIG. 1B, where the native host 103 is contained within the VSS, a VSS access circuit 124 and a VSS controller 126 coordinate the I/O of data and commands to multiple DASDs 128—shown as DASD1 through DASDN. Although multiple individual DASDs are shown, the individual DASDs could be replaced with virtual system arrangements known in the art and discussed above. For example, a native host 113 employing an MVS system could be included in a VSS 102 or, as shown in FIG. 1A, could be external to but communicatively linked with the VSS 102.

As shown in FIG. 1B, the VSS access circuit 124 and the VSS controller 126 are communicatively coupled to the DASDs 128 via communication links 130, 132, and 134. These communication links allow data and commands to be readily transferred between the DASDs 128 and the converter 200. If desired, data and commands may be transferred from the VSS 102 via the converter 200 to DASD 114 or to other components of the open host system 101.

Figure 2:
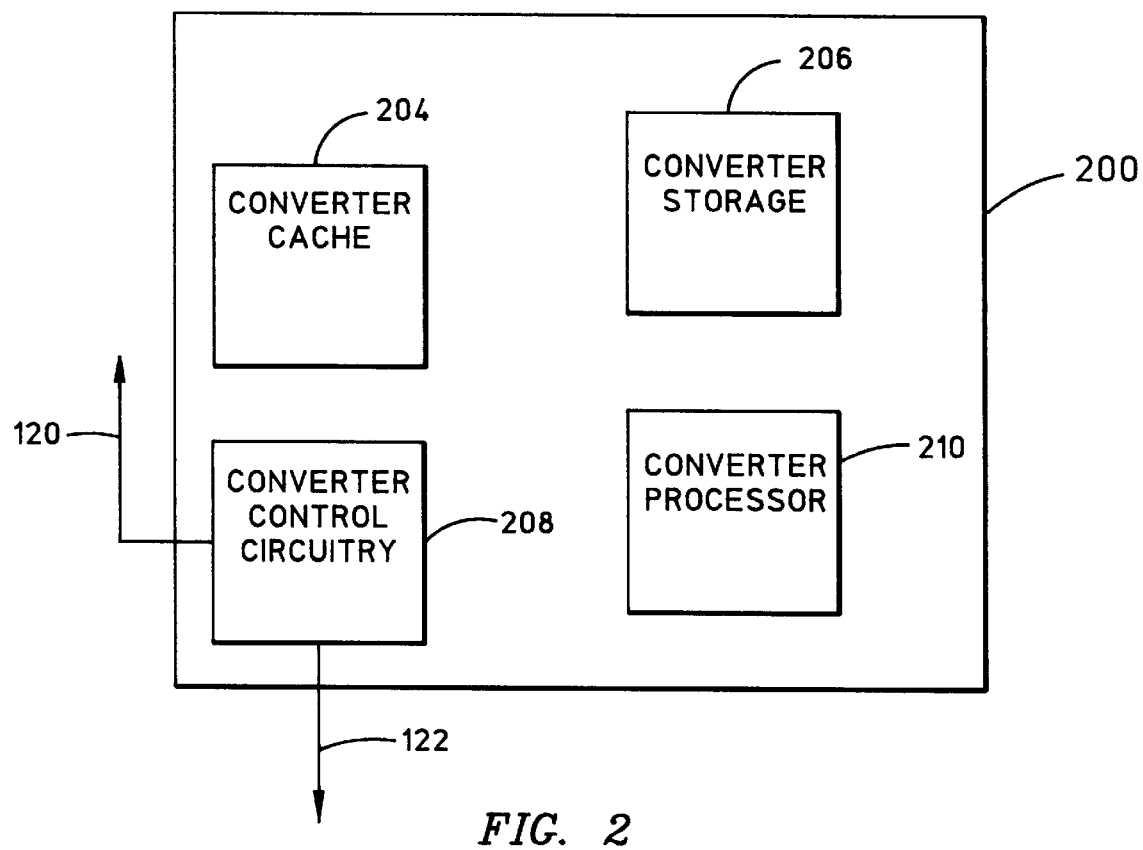
FIG. 2 is a block diagram of the hardware components and interconnections of a converter shown in FIGS. 1A and 1B in accordance with the invention.

As shown in FIG. 2, the converter 200 may include a converter cache 204, converter storage 206, converter control circuitry 208 and a converter processor 210. As shown, each of the converter components are communicatively linked and cooperate to perform the converter functions discussed below with respect to the inventors' method. In the preferred embodiment, converter cache 204 is a READ cache of at least 32 MB. Processor 210 may be a microprocessor, application specific hardware, or another processing machine. In the present example, the converter storage 206 may include a fast-access memory or non-volatile storage. The fast-access memory preferably comprises random access memory and may be used to store instructions executed by the processor 210 during such execution. The non-volatile storage may comprise, for example, one or more magnetic storage data disks such as a hard drive, an EEPROM, or any other suitable storage device widely used and known to those schooled in the art.

The communicatively links 120 and 122 couple the converter system 200 to the host system 101 and the VSS storage 102.

Despite the specific foregoing description, ordinarily skilled artisans having the benefit of this disclosure will recognize that the system discussed above may be implemented in a machine of different construction, without departing from the scope of the invention. As a specific example, one of the components of the storage 110 may be eliminated or provided on-board the processor 103; furthermore, the DASD 114 may be integral to the storage 110, even though depicted separately in FIG. 1B.

OPERATION

In addition to the various hardware embodiments described above, a different aspect of the invention concerns a method for dynamically mapping data and commands from the host system 101 employing a first interface to a VSS 102 using a second interface.

Signal-Bearing Media

Such a method may be implemented, for example, by operating the converter system 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to dynamically map data and commands from the host system 101 to the VSS 102.

Figure 3:
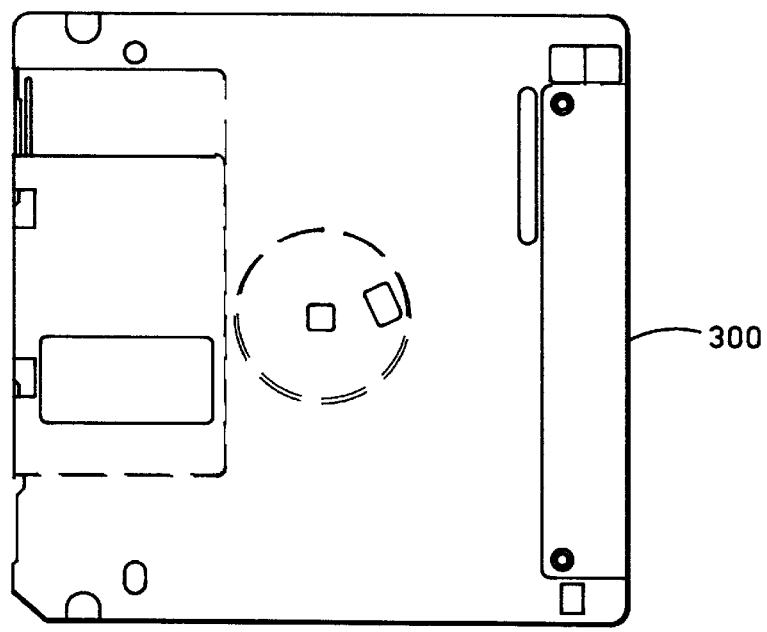
FIG. 3 is a perspective view of an exemplary signal-bearing medium in accordance with the invention.

This signal-bearing media may comprise, for example, RAM (not shown) contained within the converter system 100. Alternatively, the instructions may be contained in another signal-bearing media, such as a magnetic data storage diskette 300 shown in FIG. 3, directly or indirectly accessible by the system 100. Whether contained in the system 100 or elsewhere, the instructions may be stored on a variety of machine-readable data storage media, such as DASD 114 (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C, C++, or other suitable coding language commonly used by those skilled in the programming arts.

Overall Sequence of Operation

Figure 4A:
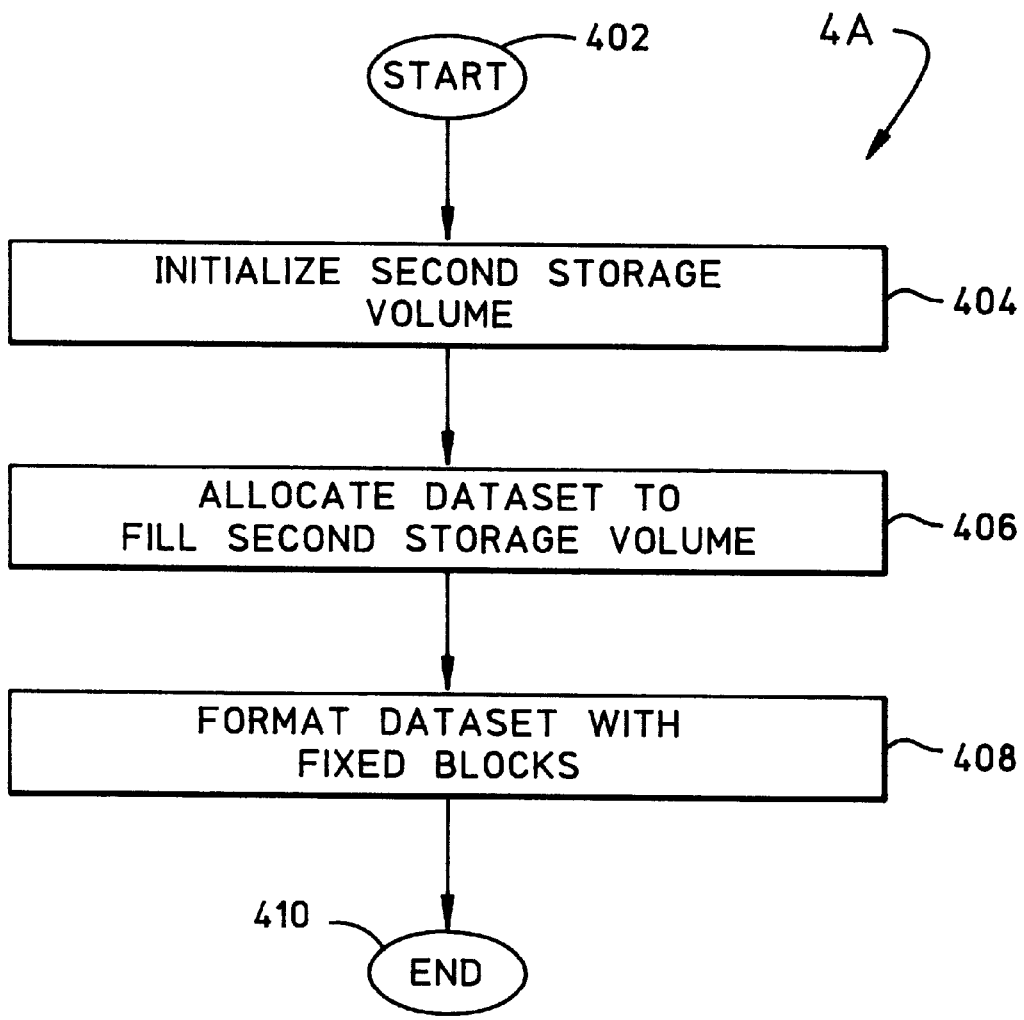
FIG. 4A is a flowchart of an operational sequence for initiating a second storage volume prior to transferring data from an open host system storage to a VSS storage in accordance with the invention.
Figure 4B:
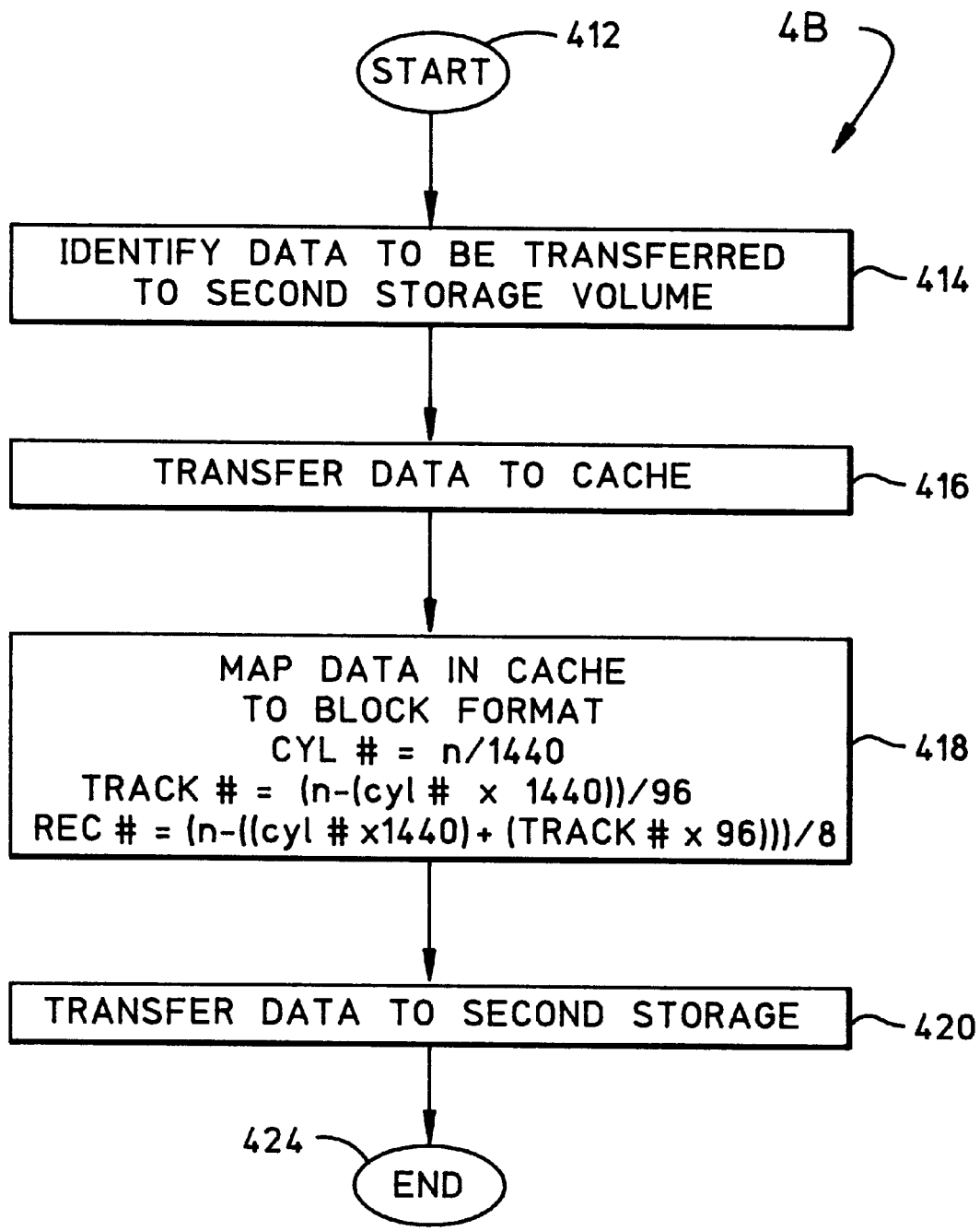
FIG. 4B is a flowchart of a write operational sequence for mapping data from an open host storage system to a VSS in accordance with the invention.
Figure 4C:
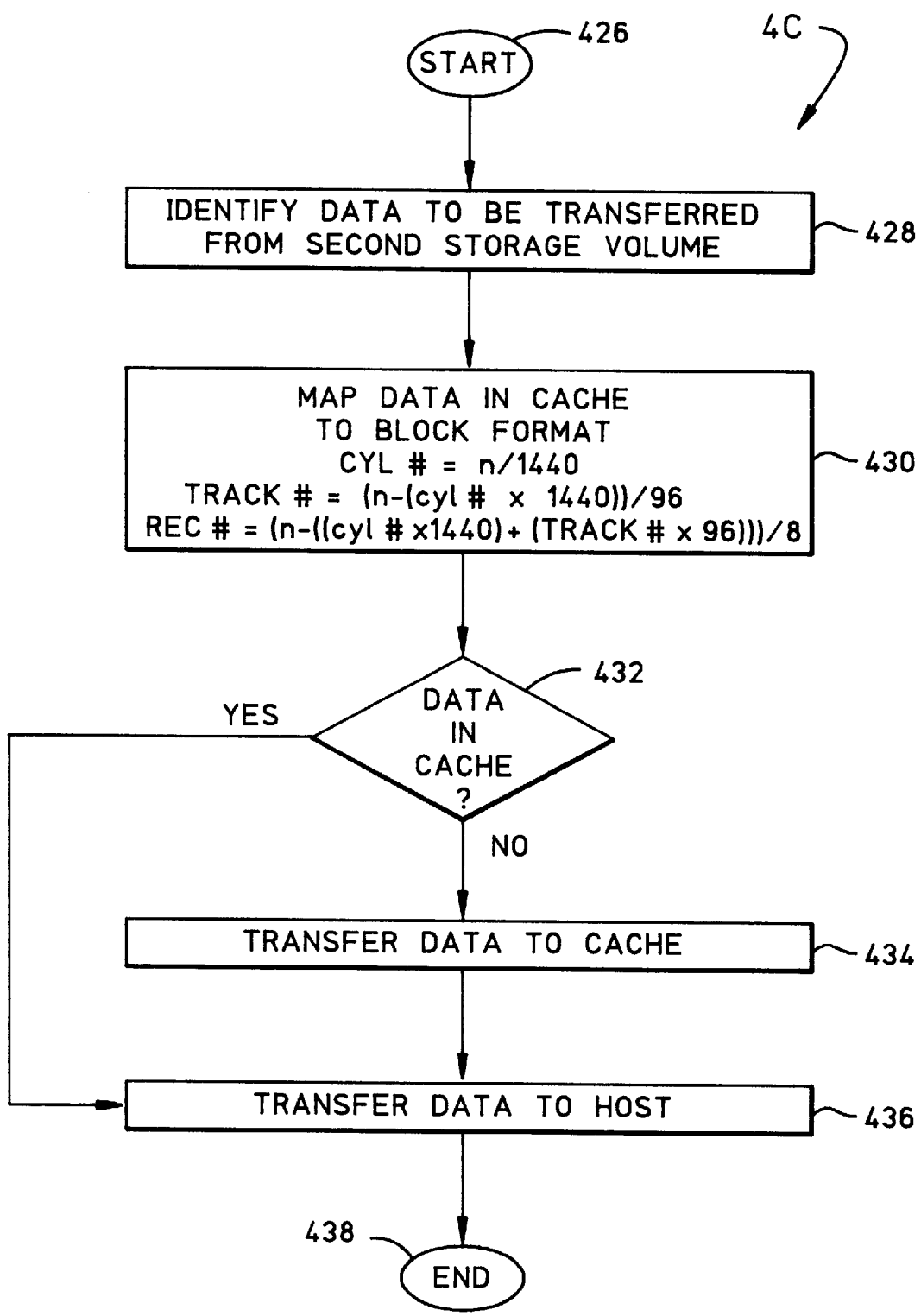
FIG. 4C is a flowchart of a read operational sequence for mapping data from a VSS to an open host storage system in accordance with the invention.

FIGS. 4A through 4C illustrate a method sequence for initiating the VSS 102, writing data from the open host system 101 to the VSS, and reading data from the VSS to the open host 101. For ease of explanation, but without any limitation intended thereby, the examples of FIGS. 4A through 4C are described in the context of the converter systems described above.

A sequence of method steps 4A illustrating one example of the initialization of the second storage VSS of the present invention is shown in FIG. 4A. The method begins in task 402 when a command is received to transfer data or commands to the VSS 102. The VSS 102 is initialized in task 404. In one embodiment, initialization is done by creating a volume table of contents on cylinder zero on the VSS 102 storage. In the preferred embodiment, the volume table of contents is on a single track of cylinder zero. As mentioned above, the VSS 102 employs an array of DASDs 128. As is commonly known to those skilled in the art, data storage on DASDs is commonly referenced as to location by cylinder and track location. The term volume as used in this application refers to a portion of a unit of storage accessible to a single read/write mechanism of a DASD, for example, part of a disk storage module such as a track, group of tracks, or a group of cylinders.

Following the initialization, a dataset is allocated in task 406 to fill the entire second storage VSS 102 volume. The dataset is allocated in the preferred embodiment in cylinders, with the starting cylinder being cylinder one and the ending cylinder being the last cylinder on the volume. The dataset allocated in task 406 is then formatted with blocks of fixed length in task 408. For example, the fixed length blocks in the preferred embodiment would be 4 KB blocks of zeros representing 12-4 KB blocks per track with 15 tracks per cylinder. This fixed block formatted dataset represents the storage configuration for the storage volume of the VSS 102. Initialization of the second storage volume VSS 102 ends in task 410. The VSS 102 must be initialized prior to data being transferred from the open host system 101 to the VSS.

FIG. 4B shows a block flow diagram of the preferred method for writing data from the open host system 101 to a VSS 102 as shown in FIG. 1A. Typically, an open system such as open host system 101 will organize the data stored on its hard disk in 512-byte blocks. "Open system" refers to a system whose characteristics comply with standards made available throughout the computer industry and that therefore can be connected to other systems complying to the same standards. For example, the small computer system interface (SCSI), or "scuzzy interface," is one such interface that is commonly used in open systems. When requesting data from a hard disk such as DASD 114 shown in FIG. 1B, a typical request will include four parameters: reading or writing, starting a 512-byte block, identifying the number of 512-byte blocks to transfer, and indicating the buffer address of where the data to be transferred will be read or written. The buffer address may be a cache located in storage 110.

After the VSS 102 volume has been initialized as described by method 4A shown in FIG. 4A, the data and commands may be written to the VSS 102 volume as shown in FIG. 4B. Writing to the VSS is done by mapping the open host system 101 formatted data to reflect the block format used by the VSS. As described below, the first set of eight 512-byte blocks (blocks 0–7) are mapped to the first 4 KB block of the VSS 102. The second set of eight 512-byte blocks are mapped to the second 4 KB block of the VSS 102, and so on, for each remaining set of 512-byte blocks. Although 4 KB blocks are used in the preferred embodiment second storage VSS 102, the 512-byte blocks may be mapped to a second storage having a block size that is any-multiple size of the 512-byte block, such as an 8 KB, 12 KB, 15 KB, or other such sized block.

Method 4B begins in task 412 when a request to write data to the VSS 102 from a non-similarly formatted storage location. The data to be transferred to the VSS is identified in task 414 and involves reading the logical block addresses of the data from DASD 114 (FIG. 2). The logical block addresses (LBAs) represent logically linked—but not necessarily contiguous—areas of storage within the logical records on the DASD 114, and a logical block is the unit of a dataset transferred when an I/O operation occurs.

After the data to be transferred has been identified, the data and commands are transferred to a temporary storage location in task 416. The temporary storage location may be cache located in storage 110, in the processor 103, or in a converter cache location within the converter 200 shown in FIG. 2. The cached open host system 101 formatted data is mapped to VSS format in task 418.

The preferred mapping method for determining where a particular 512-byte block (n) will reside comprises: cyl#= n/1440, because there are 180-4 KB blocks per cylinder; track#=(n−(cyl#*1440))/96, because there are 12-4 KB blocks per track; and rec#=(n−((cyl#*1440)+(track#*96)))/ 8. This formula allows an open system using a first storage interface to address a second storage system using a second interface as a standard DASD included in the open system. For example, in the preferred embodiment, an open host system using a SCSI-type interface will see the VSS as a standard hard disk storage included in the open host system 101. After the data has been mapped in task 418, the data is transferred to a VSS 102 volume in task 420. The transfer of data may be repeated in this manner if additional write requests are made. The method 4B ends in task 424.

The converter 200 used to implement the mapping of the data and commands in task 418 allows the VSS 102 to "appear" to the open host system 101 and work the same as any hard disk integral to the open host system. The converter system 100 dynamically translates the 512-byte hard disk LBAs of the DASD 114 into cylinder, track, and record numbers and may act as a VSS cache to read and write data to and from the open host system 101. However, the converter has no knowledge of the open system hard disk format. For example, the converter 200 would have no knowledge of boot sectors, disk partitions, or the file systems used on the DASD 114.

FIG. 4C shows a sequence of steps 4C used by the present invention in reading data stored in the VSS 102 to the open host system 101. The sequence begins in task 426 when a request for data from the VSS 102 is made. The data to be transferred from the VSS 102 is identified in task 428, identification being made as discussed above with respect to writing data to the VSS 102. After a request is made, data is mapped from the VSS 102 format to the format used by the open host system 101 as discussed above. Knowing the cylinder, track, and record number of the desired data, the data is accessed and mapped into the respective 512-byte blocks integral to the open host system 101 formatting.

The mapping of the VSS data may occur after the data has been transferred to cache 204 in one embodiment. In the preferred embodiment, the cache used corresponds to the formatting of the open host system 101. In this case, the VSS data requested to be read is converted to the open host system 101 format before being transferred to a cache. As shown in task 432, if the VSS data to be read is already in cache 204 when mapped to open host system 101 formatting then, after mapping, the data is transferred to the open host system 101 in task 436. If the VSS data is mapped first, it is then transferred to a cache in task 434 until such time as it is transferred to the host system 101 in task 436. The data might be cached in task 434 until sufficient data has been mapped to allow efficient transfer of the data, or, in the preferred embodiment, the cache may act as a data buffer to coordinate transfers between the VSS 102 and the open host system 101. The method ends in task 438.

Figure 5:
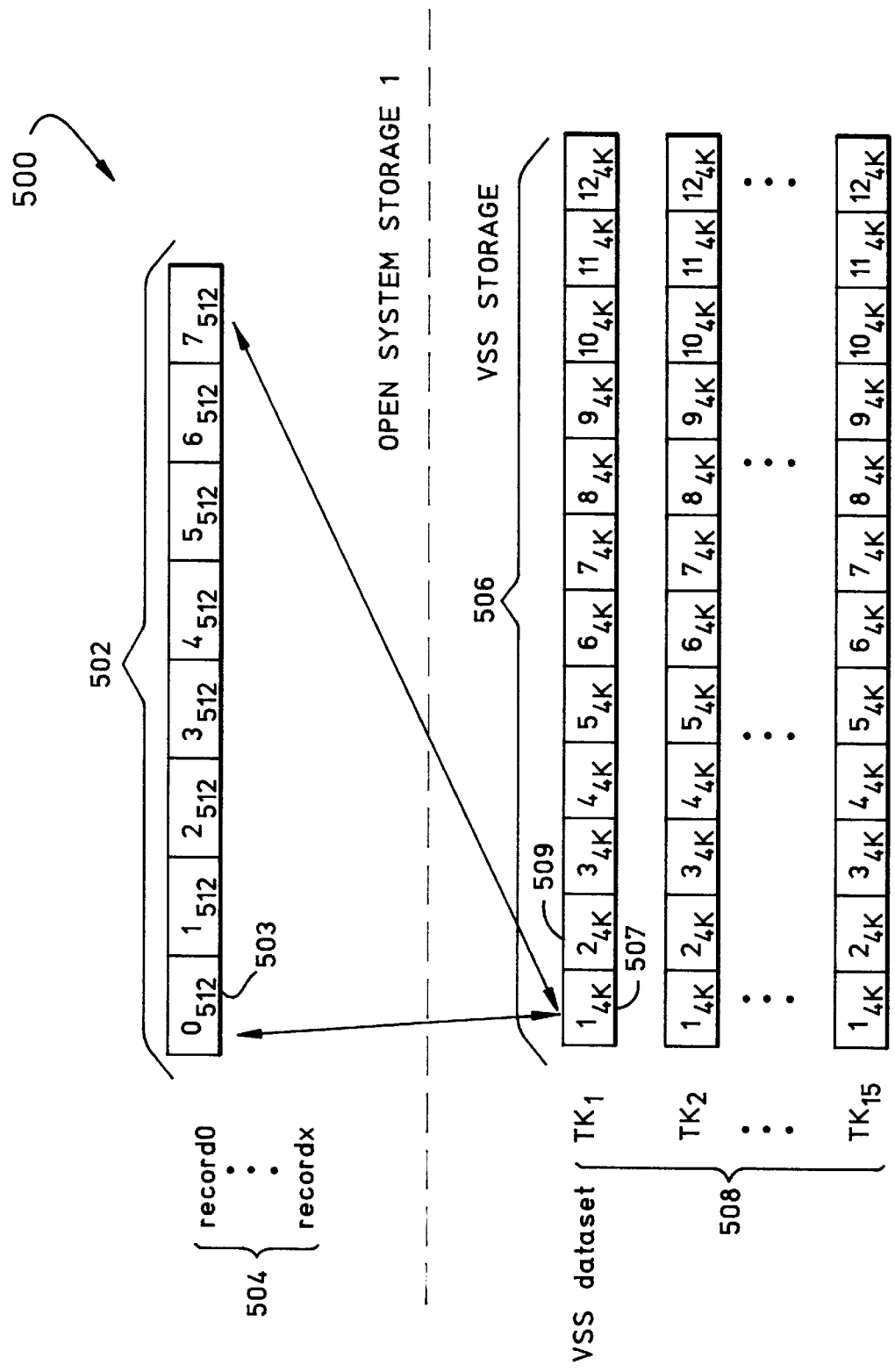
FIG. 5 is a representative illustration of the mapping of a 512-byte block arrangement used by a SCSI-type host open system to a 4 KB block arrangement used by a VSS ESCON storage system.

FIG. 5 illustrates the mapping of a 512-byte block format used by the DASD 114 to the 4 KB block arrangement used by the second storage 102. A block array 502 comprising eight concatenated 512-byte blocks 503 is shown. Eight blocks 503—designated 0 through 7—are shown for record 0 of the record 504 which comprises the records to be transferred from the host system storage DASD 114 to the VSS 102 in the preferred embodiment. The record 0 shown in FIG. 5 is used to represent the mapping of the dataset to a first 4 KB block 507 of the VSS 102. Mapping of record 1 through record X has been omitted from FIG. 5 for clarity purposes. However, the method discussed with respect to record 0 may be applied to each subsequent record in a similar fashion.

The record 0 is mapped to the block 507. Record 1 of the open system storage is mapped to block 509 of the VSS 102. This sequencing continues in the preferred embodiment for records 0 through X of the open system so that an VSS data volume, $TK_1$, shown in FIG. 5, will consist of 12-4 KB blocks. The sequence is continued for preferred embodiment VSS data tracks $TK_2$ through $TK_{15}$ of the VSS volume. The complete VSS data volume is shown in FIG. 5 as volume 508.

The present invention solves at least three major problems currently existing when trying use a storage such as the preferred VSS 102 with an open system. The VSS employed DASDs 128 can be used by the open host system with no changes to the protocol of the VSS or the open host system. This provides asset protection to those who have invested in exiting VSS systems. Furthermore, the preferred embodiment VSS can perform volume management of the data contained in an MVS system employed by the VSS, including backup, restoration, and other advance functions such a T-zero copy, and remote copy.

The preferred converter 200 also allows an open host system using a SCSI-type system to be located further than 25 meters from the VSS 102 without having to custom engineer a system. As is known to those schooled in the art, a standard SCSI-type interface may not be used with connectors and cables exceeding 25 meters due to degradation of the signal carried along the SCSI bus.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

We claim:

1. An apparatus for dynamically mapping data and commands between a first system and a second system, comprising:

the first system having first storage and employing a first interface;

the second system having second storage and employing a second interface, the second storage including a direct access storage device (DASD) having cylinders, tracks, and record numbers;

a converter including storage and circuitry, the converter mapping the first system's data and commands to the format of the second system's data and commands, and the converter being linked to the first and second systems;

a processor included in the converter, the processor executing instructions to:

initialize the second storage, the second storage including a volume of data and including a volume table of contents allocated to a first cylinder on the DASD;

allocate a data set to other cylinders beginning with cylinder two and ending on the last cylinder of the volume;

indicate a location and size of the data set in the volume table of contents of the second storage;

map the data and commands contained in the predetermined length blocks of the first storage into other sized fixed length blocks of the second storage;

transfer data and commands from the first system to the second system;

map data and commands contained in the other sized fixed length blocks of the second storage back to the predetermined length blocks of the first storage;

transfer the data and commands from the second system to the first system; and determine a cylinder number, track number, and record number on the second storage where a predetermined length block resides, the cylinder number=n/1440, the track number=(n−(cylinder number H 1440))/96, and the record number=(n−(cylinder number H 1440)+(track number H 96)))/8, where n equals a number predetermined length blocks to be mapped.

2. The apparatus recited in claim 1, the processor executing further instructions to map data and commands by:

using predetermined length blocks that are 512-bytes in length;

using other fixed length blocks that are 4-kilobytes in length; and storing a set of the 512-byte blocks in a fixed length area of the second storage, a set including eight 512-byte blocks, a first set being stored in the first fixed length block, and subsequent sets of 512-byte blocks being stored in subsequent fixed length blocks.

3. The apparatus recited in claim 2, wherein the second storage DASD comprise an enterprise system connection multiple virtual system count key data (ESCON MVS CKD) storage system.

4. The apparatus recited in claim 3, wherein the first system is an open system.

5. The apparatus recited in claim 4, wherein the first system uses a small computer system interface (SCSI).

6. An apparatus for dynamically mapping data and commands between a first system having first storage using a first interface to a second system having second storage using a second interface, the first system's data and commands contained in blocks of predetermined length, comprising:

means for initializing the second storage, the second storage including a volume of data and including a volume table of contents;

means for allocating a data;

means for indicating a location and size of the data set in the volume table of contents by the second storage;

means for mapping the data and commands contained in the predetermined length blocks of the first system into other sized fixed length blocks of the second system;

means for transferring data and commands from the first system to the second system; and means for determining a cylinder number, track number, and record number where a predetermined length block resides, the cylinder number=n/1440, the track number=(n−cylinder number H 1440)/96, and the record number=(n−(cylinder number H 1440)+(track number H 96)))/8, where n equals a number of predetermined length blocks to be mapped.

7. A method for dynamically mapping data and commands between a first system having first storage and using a first interface, and a second system having second storage and using a second interface, the first system's data and commands contained in blocks of predetermined length, the second storage including a direct access storage device (DASD) having cylinders, tracks, and record numbers, the method comprising:

initializing the second storage, the second storage including a volume of data and including a volume table of contents, wherein the volume table of contents is allocated to a first cylinder on the DASD;

allocating a data set to other cylinders beginning with cylinder two and ending on the last cylinder of the volume, indicating a location and size of the data set in the volume table of contents of the second storage;

mapping the data and commands contained in the predetermined length blocks of the first storage into other sized fixed length blocks of the second storage;

transferring data and commands from the first system to the second system;

mapping data and commands contained in the other sized fixed length blocks of the second storage back to the predetermined length blocks of the first storage;

transferring the data and commands from the second system to the first system; and determining a cylinder number, track number, and record number on the second storage where a predetermined length block resides, the cylinder number=n/1440, the track number=(n−(cylinder number H 1440))/96, and the record number=(n−(cylinder number H 1440)+ (track number H 96)))/8, where n equals a number predetermined length blocks to be mapped.

8. The method recited in claim 7, mapping the data and commands including:

using predetermined length blocks that are 512-bytes in length;

using other fixed length blocks that are 4-kilobytes in length; and storing a set of the 512-byte blocks in a fixed length area of the second storage, a set including eight 512-byte blocks, a first set being stored in the first fixed length block, and subsequent sets of 512-byte blocks being stored in subsequent fixed length blocks.

9. The method recited in claim 8, the second storage DASD comprising an enterprise system connection multiple virtual system count key data (ESCON MVS CKD) storage system.

10. The method recited in claim 9, the first system being an open system.

11. The method recited claim 10, the first system using a small computer system interface (SCSI).

12. A method for dynamically mapping data and commands from a first system employing a small computer system interface (SCSI) to a second system having direct access storage device (DASD) storage using an enterprise system connection (ESCON) interface, the DASD storage has cylinders, tracks, and record numbers, the first system data and commands contained in first storage in 512-byte blocks, comprising:

initializing the DASD storage system, the storage system comprising a volume of data and including a volume table of contents on a first cylinder;

allocating a data set that fills the volume, the data set allocated in cylinders starting on cylinder two and ending on the last cylinder of the volume;

mapping the data and commands contained in the 512-byte blocks of the first storage into 4 KB blocks of the DASD storage system, the mapping comprising:

mapping a set of the 512-byte blocks to a 4 KB block of the DASD storage system, a set including eight 512-byte blocks, a first set being stored in the first 4 KB block, and subsequent sets of 512-byte blocks being stored in subsequent 4 KB blocks;

transferring data and commands from the first system to the second system;

mapping data and commands contained in the 4 KB length blocks of the DASD storage system back to the 512-byte length blocks of the first system;

transferring the data and commands from the second system to the first system; and determining a cylinder, number, track number, and record number where a 512-byte block will reside, the cylinder number=n/1440, the track number=(n−(cylinder number H 1440))/96, and the record number=(n−(cylinder number H 1440)+(track number H 96))/8, where n equals a number of 512-byte blocks to be mapped.

13. A signal-bearing medium tangibly embodying a program of machine-readable instructions executable by a digital processing apparatus to perform a method for dynamically mapping data and commands from a first system using a first interface, and a second system having second storage and using a second interface, the first system data and commands contained in blocks of predetermined length, said method comprising:

initializing the second storage, the second storage including a volume of date and including a volume table of contents;

allocating a data set;

indicating a location and size of the data set in the volume table of contents of the second storage;

mapping the data and commands contained in the predetermined length blocks of the first storage into other sized fixed length blocks of the second storage;

transferring data and commands from the first system to the second system;

mapping data and commands contained in the other sized fixed length blocks of the second storage back to the predetermined length blocks of the first storage;

transferring the data and commands from the second system to the first system; and determining a cylinder number, track number, and record number on the second storage where a predetermined length block resides, the cylinder number=n/1440 the track number=(n−(cylinder number H 1440))/96, and the record number=(n−(cylinder number H 1440)+ (track number H 96)))/8, where n equals a number predetermined length blocks to be mapped.

14. The signal-bearing medium recited in claim 13, the method further comprising:

using predetermined length blocks that are 512-bytes in length;

using other fixed length blocks that are 4-kilobytes in length; and storing a set of the 512-byte blocks in a fixed length area of the second storage, a set including eight 512-byte blocks, a first set being stored in the first fixed length block, and subsequent sets of 512-byte blocks being stored in subsequent fixed length blocks.

15. A signal-bearing medium tangibly embodying a program of machine-readable instructions executable by a digital processing apparatus to perform a method for dynamically mapping data and commands from a first system having first storage employing a first interface to a direct access storage device (DASD) storage system using a second interface, the first system data and commands contained in blocks of predetermined length, said method comprising:

initializing the DASD storage system, the DASD storage system including a volume of data and including a volume table of contents on a cylinder;

allocating a data set that fills the volume table of contents, the data set allocated in cylinders other than the cylinder containing the volume table of contents;

mapping the data and commands contained in the predetermined length blocks of the host system into other sized fixed length blocks of the DASD storage system;

transferring data and commands from the first system to the DASD storage system;

mapping data and commands contained in the other sized fixed length blocks of the DASD storage back to the predetermined length blocks of the first storage;

transferring the data and commands from the DASD system to the first system;

determining a cylinder number, track number, and record number on the DASD storage where a predetermined length block resides, the cylinder number=n/1440; the track number=(n−(cylinder number H 1440))/96, and the record number=(n−(cylinder number H 1440)+ (track number H 96)))/8, where n equals a number predetermined length blocks to be mapped.

16. The signal-bearing medium recited in claim 15 for tangibly embodying a program of machine-readable instructions executable by a digital processing apparatus to perform a method, the method further comprising:

using predetermined length blocks that are 512-bytes in length;

using larger fixed length blocks that are 4-kilobytes in length; and storing a set of the 512-byte blocks in a fixed length block of the DASD storage system, a set including eight 512-byte blocks, a first set being stored in the first fixed length block, and subsequent sets of 512-byte blocks being stored in subsequent fixed length blocks.

* * * * *